US010545579B2

(12) United States Patent
De Foras et al.

(10) Patent No.: US 10,545,579 B2
(45) Date of Patent: *Jan. 28, 2020

(54) REMOTE CONTROL WITH 3D POINTING AND GESTURE RECOGNITION CAPABILITIES

(71) Applicant: MOVEA, Grenoble (FR)

(72) Inventors: Etienne De Foras, Saint Nazaire les Eymes (FR); Guillaume Aujay, Grenoble (FR); Gregoire Aujay, Grenoble (FR); David Gomez, Grenoble (FR); Loic Michallon, Grenoble (FR); Nicolas Meunier, Bernin (FR)

(73) Assignee: MOVEA, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,262

(22) Filed: Mar. 26, 2018

(65) Prior Publication Data
US 2018/0348882 A1 Dec. 6, 2018

Related U.S. Application Data

(63) Continuation of application No. 13/631,134, filed on Sep. 28, 2012, now Pat. No. 9,927,876.

(51) Int. Cl.
G06F 3/0346 (2013.01)
G06F 3/01 (2006.01)

(52) U.S. Cl.
CPC ............ *G06F 3/017* (2013.01); *G06F 3/0346* (2013.01); *G08C 2201/32* (2013.01)

(58) Field of Classification Search
CPC .... G06F 3/017; G06F 3/0346; G08C 2201/32
See application file for complete search history.

(56) References Cited

U.S. PATENT DOCUMENTS

| 5,598,187 | A | 1/1997 | Ide et al. |
| 8,010,313 | B2 | 8/2011 | Mathews et al. |
| 9,932,876 | B2* | 4/2018 | Smith ............... B60W 50/0097 |
| 2010/0087139 | A1* | 4/2010 | Glass .................... G06Q 10/10 455/3.01 |
| 2012/0323521 | A1 | 12/2012 | De Foras et al. |

FOREIGN PATENT DOCUMENTS

WO 2012065885 A1 5/2012

* cited by examiner

Primary Examiner — LaTanya Bibbins
(74) Attorney, Agent, or Firm — Baker Hostetler

(57) ABSTRACT

A remote control, such as a 3D air mouse, includes motion sensors used to measure position/orientation in space to alternatively control a cursor on a display, recognize gestures by the user so that data/commands can be entered into an electronic system being controlled or the like. Timed sequences of pressing a single trigger button and the quantity of motion during said sequences are both timed in relation to thresholds to switch between modes.

31 Claims, 8 Drawing Sheets

SWIPE LEFT

SWIPE RIGHT

SWIPE UP

SWIPE DOWN

Left quick roll

Right quick roll

BACK

CHECK

Shake

Close

REMOTE CONTROL WITH 3D POINTING AND GESTURE RECOGNITION CAPABILITIES

CROSS REFERENCE TO RELATED APPLICATIONS

This application is a continuation of U.S. patent application Ser. No. 13/631,134 filed Sep. 28, 2012.

BACKGROUND

1. Field of the Invention

The present invention deals with a motion based remote control of a base station having a display. More specifically, it allows switching between a number of different control modes using a single trigger button located on said remote control.

2. Description of the Related Art 3D pointing devices (often also referred to as held "in the air") which allow control of virtual zones on a display are known in the art. Such pointing devices normally include a number of sensors (for example, optical sensors, accelerometers, gyrometers, or magnetometers) capable of measuring the motion of the device in space and to convert the movement the user imparts to the pointing device into displacements of a cursor on the display. Pointing devices of this type have been disclosed, for instance, by U.S. patent application Ser. No. 12/147,811 assigned to the same assignee as the present application. The pointing devices disclosed in this patent application include accelerometers and gyrometers, but other sensors are known in the art to perform the same functions.

Some of these devices also allow the user to enter commands by making gestures in the air with the remote control (like a number, a letter or a more complex input). Devices with this type of gesture recognition have been disclosed for instance in the U.S. patent application Ser. No. 13/499,175 assigned to co-assignees, one of which is the assignee of the present application. The devices disclosed in this patent application use dynamic time warping algorithms to recognize the user's gestures, but other algorithms are also known in the art, like hidden Markov models.

Pointing devices may include a number of buttons or triggers to control functions of the base station or to switch between a pointing mode and a gesture recognition mode. It is for instance the case of the ones disclosed by U.S. Pat. No. 5,598,187. However, in this disclosure, the users have to use a number of different buttons whereas they have a need to use simple commands to switch, for example, between the pointing mode and the gesture recognition mode. The devices of the prior art have not solved this problem of intuitive and easy switching between different modes of the remote control, without using multiple buttons.

SUMMARY OF THE INVENTION

The invention provides a solution to this problem by defining criteria for a switching decision between various modes which are easy to implement because they are based on a combination of a temporal analysis of the button press and a quantity of motion analysis.

To this effect, the an embodiment of the present invention provides a user to machine interface comprising: a remote control with at least a trigger button; a communication link between the remote control and a base station having a display; motion sensing capabilities for generating motion signals at least partially representative of the motion of the remote control; processing capabilities configured for processing said motion signals in at least one of a first mode and a second mode of operation of said interface, and for switching the operation of the interface between said first and second modes, at least one of which enables operation of said interface based on motion of the remote control, wherein the switching decisions are based on an evaluation of a combination of i) an analysis of a pattern of at least a sequence of ON/OFF states of said trigger button resulting from the user pressing/releasing said trigger button, and ii) a function $Q_{motion}$ representative of a quantity of motion imparted to the remote by the user, derived from the motion signals at at least one moment during said sequence of ON/OFF states.

Embodiments of the invention also provide a method and a computer program to operate said interface.

Embodiments of the invention not only deal with how the user can switch between different modes of the remote control, but also offer solutions to optimize the transitions between the modes. During the gesture recognition mode, the cursor is frozen on the screen because the user's motion should preferably not impart motion to the cursor during gesture recognition, and in order not to limit the gesture of the user to a 2D gesture. At the end of the gesture, a timeout is introduced before returning to the pointing mode in order to prevent misalignment between the pointing direction of the remote and the cursor on the screen. In most cases, the user likes the remote to behave approximately like a laser pointer, so that in this preferred use, the direction in which the remote points is aligned with the position of the cursor. The wording "misalignment" is used here to define situations where the pointing direction and the cursor position are not natural or not wanted by the user.

Additionally, within the gesture mode, the remote control of the invention is able to discriminate between different gesture recognition modes, for instance, between a single axis rotation detection mode which uses a binary criteria, and classification algorithms. Thus, the interaction is made simpler for the user.

The single axis rotation mode is explained in detail in French patent application no. FR12/50140 assigned to the same assignee as the present application, the contents of which are incorporated herein by reference. The basic principle of this mode is that the system recognizes when the user is rotating or translating the remote along a single axis. These single axis gestures can then be used to control parameters of the system in a continuous way. For example, a user can change the volume of a television set by changing the pitch of the remote. As soon as the system recognizes the user is performing a pitch rotation (along a single axis), the system will operate the volume control of the base station, said control may give a feedback to the user through a dedicated graphics on the display, which can, for example, be a vertical graphics bar on the screen that represents the volume level. While the user changes the pitch of the remote, the volume is adapted immediately and continuously with a possible visual feedback on the screen. When the user ends his single axis gesture, the volume is set according to the last value.

We will further refer to this single axis mode as the analogue control mode since this mode is mainly used for an analogue control of system parameters, like audio volume or display brightness.

Many possibilities exist to map the available single axis gestures (rotation or translation) to control parameters in a continuous way. The fact that an embodiment of the system can distinguish between these single axis gestures and more complex gestures, like drawing symbols in the air, adds an important ergonomic and intuitive feature to the system because the user does not have to go through different menus to control the mapped system parameters.

Even though the remote is equipped with motion sensors, the user can also use conventional buttons on the remote to interact with the system. For example, the remote might still be equipped with numbered buttons so the user can directly enter the number of the desired channel. In this mode the motion sensors are not used e.g. to control the cursor on the screen or to recognize gestures. Therefore, we will call this mode the passive mode. When in this passive mode, some or all of the motion sensors can be set to a sleep mode to save power. The interface of this embodiment of the invention enables easy switching between this passive mode and any other modes like cursor control or gesture recognition.

In the description of the present invention the term pointer, pointing device, remote control or remote will be used interchangeably. However, it should be understood that this does not mean that the invention is limited to a classical type of remote control for television sets. The invention also applies to any other kind of input device with motion sensing capabilities and at least a trigger button, real or virtual, for example a mobile device like a smart phone.

BRIEF DESCRIPTION OF THE DRAWINGS

The invention will be better understood, and its various features and advantages will become apparent, from the description of various embodiments and of the following appended figures:

FIG. 5 displays a variant of FIG. 3a;

DETAILED DESCRIPTION

Figure 1:
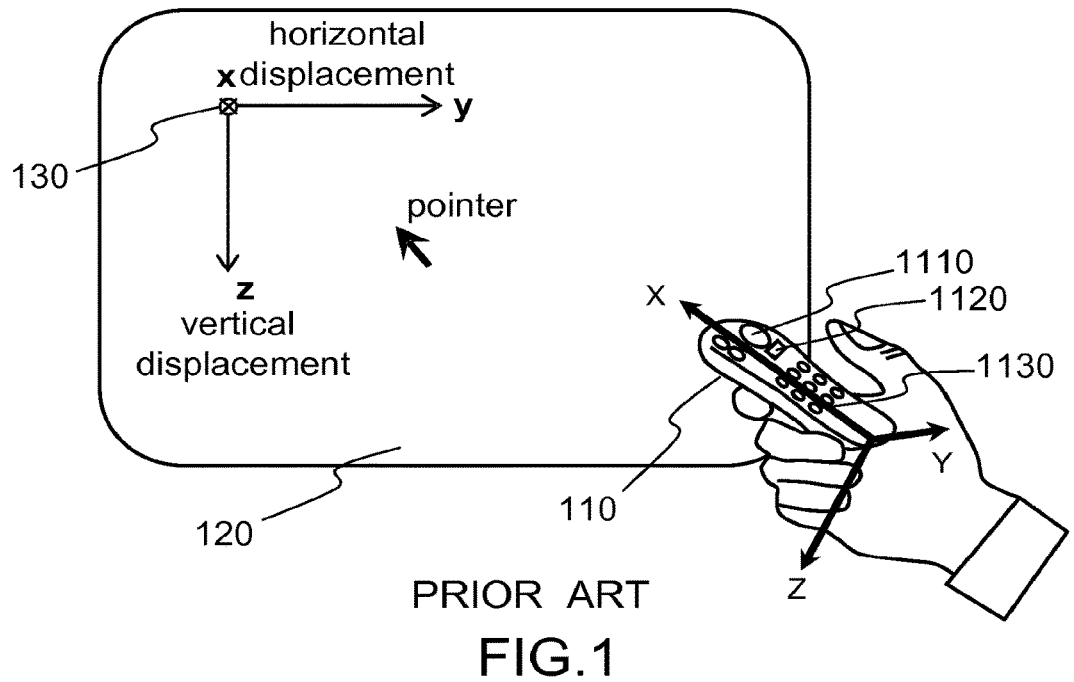
FIG. 1 represents a pointing device of the prior art.

Reference is made to U.S. patent application Ser. No. 12/147,811 assigned to the same assignee of the present application, which is incorporated herein by reference.

The pointing device 110 or pointer advantageously has the form and the shape of a television remote control, that is to say it is of elongate form, able to be held in the user's hand. The pointer is associated with a mobile element, for example a cursor 130 able to move in a plane surface, for example a screen 120 or a writing surface controlled by a base station. The base station can be a fixed computer, a mobile computer, a tablet, a game console, a set top box, etc. The movements of this mobile element are controlled by the movements of the pointer. The pointer is advantageously provided with buttons 1110, 1120, 1130 on several of its faces to control the functions of the base station to which access is made possible by the remote control. The pointer comprises a power supply and a channel of transmission to the base station to the object to be controlled (not shown). Radiofrequency transmission can be effected with a Bluetooth waveform and protocol or with a Wi-Fi waveform and protocol (Standard 802.11g). Transmission can be performed by infra-red or by radiofrequency. The transmitted signals are the commands corresponding on the one hand to the depression of one of the buttons 1110, 1120, 1130 present on the body of the pointer, which triggers the execution of a function and on the other hand to the sensing of the movement of the pointer so as to control the movements of a cursor on the control screen of the base station or the object to be controlled. These control signals may be generated by a computation module (not shown) either embedded in the pointer itself, or embedded into the base station or distributed between the pointer and the base station. The computation module may advantageously comprise a sub-module for compensating for the torsion imparted to the pointer by the user. The pointer comprises at least a computation module that deals with some processing of the buttons and some processing of the motion sensors. This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory for storing the code to be executed and the permanent data which it requires and a dynamic work memory. The computation module receives as input the outputs from two types of sensors. On the one hand, angular velocity sensors (not shown) have the function of measuring the rotations of the pointer in relation to two or three axes. These sensors are preferably gyrometers. It may be a two-axis gyrometer or a three-axis gyrometer. It is for example possible to use the gyrometers provided by Analog Devices with the reference ADXRS300. But any sensor capable of measuring angular rates or velocities is usable. It is in particular possible to envisage a camera whose image processing compares successive images so as to deduce therefrom the displacements which are combinations of translations and of rotations. It is then desirable, however, to have a substantially greater computational capability than that needed by a gyrometer. It is also possible to use magnetometers, measurement of whose displacement with respect to the terrestrial magnetic field makes it possible to measure the rotations with respect to the frame of reference of this field, it is for example possible to use the magnetometers with the reference HMC1001 or HMC1052 from the company Honeywell or KMZ41 from the company NXP. Whichever sensors are used, their measurements can be read in the frame of reference of the pointer. If this frame of reference is not identical, to within a position translation, to the frame of reference of the user and to the frame of reference of the pointer, the measurements may suffer a bias which may give rise to inconsistent displacements of the mobile element. This is why within the computation module may be provided a compensation sub-module the function of which is to compute the displacements of the mobile element in the plane surface as a function of the displacements of the limb of the user holding the pointer, said function being corrected for the impact of the torsion imparted to the pointer by the user. The compensation sub-module recovers as input the outputs from a second sensor which measures the linear accelerations of the pointer ax, a_y, az. Preferably, the sensor is a three-axis accelerometer (not shown). Advantageously, the sensors are both produced by MEMS (Micro Electro Mechanical Systems) technology, optionally within one and the same circuit (for example reference accelerometer ADXL103 from Analog Devices, LIS302DL from ST MicroElectronics reference gyrometer MLX90609 from Melixis, ADXRS300 from Analog Devices). It will be noted, however, that a camera supplemented with an image processing device can also replace the two sensors, the angular rates/velocities and linear accelerations of displacement of the pointer being deducible from a correlation of successive images, and/or from a frame by frame image processing.

FIG. 1 illustrates the different frames of reference which are used for defining cursor control from a handheld device. These frames may also be used to understand transformations of reference frames which are useful to describe a roll compensated variant for pointing, i.e. a pointing which is devoid from a roll effect due to the fact that the output of the gyros is given in the frame of reference of the pointer which is different from the frame of reference of the screen.

One generally defines a screen reference frame as being the orthonormal reference frame tied to the screen (xyz), the z axis being directed downwards. The displacement of the mobile element is defined in this reference frame along the axes y and z. A second reference frame corresponds to the reference frame of the device (XYZ), X being in the principal direction of pointing, Y toward the right and Z downwards from the device. This reference frame is defined by referring the reference frame (XYZ) back to the horizontal plane. The switch from the reference frame of the user to the reference frame of the device is therefore performed through two successive rotations (pitch θ, roll ψ). Moreover, the user not necessarily being placed facing the screen, the switch from this reference frame to the screen reference frame (xyz) is performed through a rotation (yaw φ).

Embodiments of the present invention are applicable whatever technology is chosen for cursor control from the user's motion imparted to the pointing device. For example MEMS type sensors, like gyroscopes or accelerometers can be mounted in the remote control. Another example is systems that use a camera in combination with markers or LEDs (for example the Nintendo Wii system, or the Philips Uwand). In these systems, the markers are mounted on the system or screen, and a small camera in the remote, or vice-versa and the images from the camera are processed to calculate, by way of exemplary embodiment, position and orientation of the remote from a spatial comparison of the actual image to a reference image.

Figure 2:
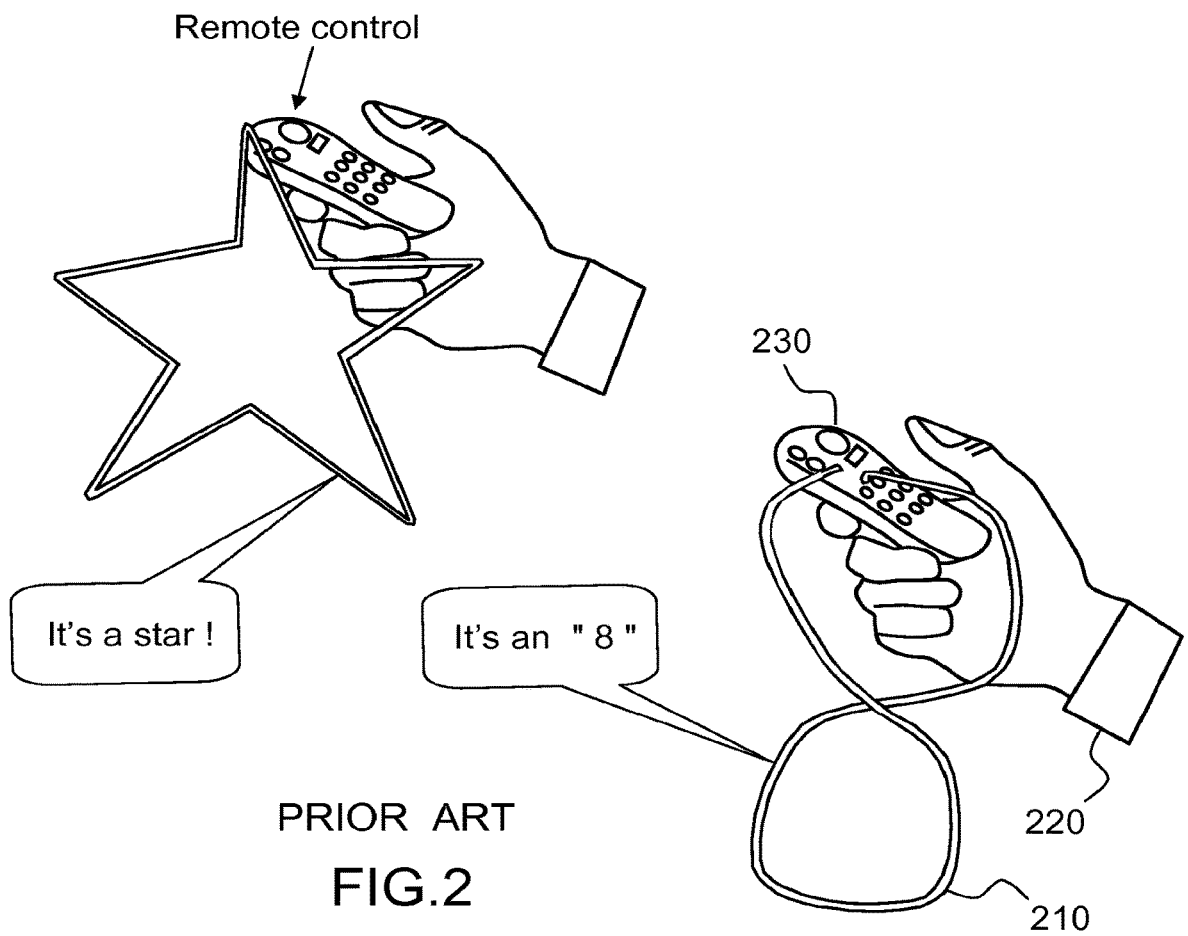
FIG. 2 represents a device with gesture recognition capabilities of the prior art.

FIG. 2 represents a device with gesture recognition capabilities of the prior art.

Reference is made to U.S. patent application Ser. No. 13/499,175 assigned to co-assignees, one of which is the assignee of the present application, and which is incorporated herein by reference. This field of technology is notably of interest to the general public for man-machine interaction applications or those based on gesture recognition (for example, multimedia system, interactive game consoles, universal remote control for electrical and/or electronic apparatus of all kinds at home, use of a mobile telephone as remote control, control of musical instruments, etc.). It may also relate to professional or semiprofessional applications, such as writing recognition or simulation for training, for sports, flying, or other activities.

Such systems preferably use motion sensitive sensors located in a device moved by the gesture of the person (3D mouse, remote control, telephone, toy, watch, accessories, garments, etc.). In such devices it is possible to use sensors of the MEMS type (gyroscopes and/or accelerometers) like in the pointing device described above in relation to FIG. 1, and magnetometers, but the same principles apply to other motion-sensitive measurements, such as image acquisition, possibly in the infrared, force or pressure measurements, measurements performed by photoelectric cells, telemetry measurements, radar or lidar measurements, etc. Preferably, however, the sensors used to provide signals are sufficiently representative of the gestures to be captured, in particular of the number of degrees of freedom that it is necessary to take into account in order to recognize them.

To give an example, FIG. 2 shows a gesture 210 representative of an "8" produced by an entity 220, in this case a hand of a user. This entity is instrumented with a device sensitive to the movements 230, in the case which is represented a remote control. The "8" may for example be the number of a television channel or the number of a game on a console. Objects may thus be commanded, by being called by one or more letters or numbers that represent said objects in a code specific to the application, and then one of the functions that said objects may execute may be called by another alphanumeric character of a second level of said code.

In the field of multimedia applications on a personal computer or on a room console, it is possible to use a 3D mouse (i.e. held "in the air") or with any other sensitive peripheral allowing interaction controlled by control software. It may for example be an AirMouse™ that comprises two gyroscopic sensors, each having a rotation axis. The gyroscopes used may be those of the Epson XV3500 brand. Their axes are orthogonal and deliver the speed angle of yaw (rotation about an axis parallel to the vertical gravity axis) and the speed angle of pitch (rotation about an axis belonging to a horizontal plane). The instantaneous pitch and yaw velocities measured by the two gyroscope axes are transmitted to a microcontroller built into the body of the mouse and converted by said microcontroller into a displacement. This data, representative of the movement of a cursor on a screen facing the user is transmitted by radio to a computer or to an apparatus that controls the display of the moving cursor on the screen. The conversion process may be also processed in the base station that uses the cursor. The gestures performed by the hand holding the AirMouse take on an actuation meaning whenever they are recognized by the system. For example, a cross (or an "alpha" sign) is made to suppress an item on which the system focuses ("active" item in computer language).

It is also possible to recognize and count certain technical gestures, such as a forehand or a backhand when playing virtual tennis, for the purpose of statistical match analysis, for example. It is also possible to study the profile of a performed gesture relative to an ideal or model technical gesture and to analyze the differences (notably the gesture phase in which the gesture performed departs from the model), so as to target or identify the defect in the gesture (a jerk at the moment of striking the ball for example).

The remote control may comprise a three-axis accelerometer, a three-axis magnetometer, a preprocessing capability for preprocessing signals from the sensors, a radiofrequency transmission module for transmitting said signals to the processing module itself, and a battery. This movement sensor is called a "3A3M" sensor (having three accelerometer axes and three magnetometer axes). The accelerometers and magnetometers are commercial microsensors of small volume, low power consumption and low cost, for example a KXPA4 3628 three-channel accelerometer from Kionix™ and Honeywell™ magnetometers of HMC1041Z (1 vertical channel) and HMC1042L (2 horizontal channels) type. Other suppliers exist: Memsic™ or Asahi Kasei™ in the case of magnetometers and STM™, Freescale™ and Analog Device™ in the case of accelerometers, to mention only a few. In a sensing device of this type, for the 6 signal channels, analog filtering only may be performed and then, after analog-digital (12 bit) conversion, the raw signals are transmitted by a radiofrequency protocol in the Bluetooth™ (2.4 GHz) band optimized for consumption in this type of application. The data therefore arrives raw at a controller, which can receive the data from a set of sensors. The data is read by the controller and acted upon by software. The sampling rate is adjustable. By default, the rate is set at 200 Hz. However, higher values (up to 3000 Hz, or even higher) may be envisaged, allowing greater precision in the detection of shocks for example. An accelerometer of the above-mentioned type is sensitive to the longitudinal displacements along its three axes, to the angular displacements (except about the direction of the Earth's gravitation field) and to the orientations with respect to a three-dimensional Cartesian reference frame. A set of magnetometers of the above type serves to measure the orientation of the sensor to which it is fixed relative to the Earth's magnetic field and therefore orientations with respect to the three reference frame axes (except about the direction of the Earth's magnetic field). The 3A3M combination delivers smoothed complementary movement information. The same type of configuration can be used in another field of application, namely in video games. In this case, the gestures allow deeper immersion and very often require to be recognized as soon as possible. For example, a right hook in boxing will be recognized even before the end of the gesture: the game will rapidly trigger the action to be undertaken in the virtual world.

It is also possible to include in the remote control two micro-gyroscope components (having two rotation axes in the plane of the circuit and one rotation axis orthogonal to the plane of the circuit). The addition of this type of sensor provides a wealth of possibilities. It allows typical IMU (Inertial Measurement Unit) preprocessing, which makes it possible to deliver a dynamic angle measurement. The 3A3M3G combination (in which G stands for gyroscope) delivers smoothed complementary movement information, even for rapid movements or in the presence of ferrous metals that disturb the magnetic field. For this type of implementation, advantageous preprocessing consists in resolving the orientation of the sensor, which can then be used in order to estimate the movement acceleration and get back to the position by double integration. This position represents the trajectory of the gesture—data which may be easier to classify.

A smart phone can also be used as a pointing device (see PCT application published no. WO2012/065885 assigned to the assignee of the present application). The most frequent gestures which have to be recognized to properly operate a telephone are relatively simple. For example, tapping against the telephone's casing, performing translational movements in all directions, or recognizing the gesture of picking up the telephone or putting it down. However, if the mobile telephone contains this type of sensor able to monitor pointing, the description of the operating modes is akin to that of the field of multimedia applications (see above) in which the mobile telephone is used in place of a remote control or a mouse.

It will therefore be seen that the range of possible applications for gesture recognition in combination with pointing is very broad and that various sensors may be used. Various kinds of classification algorithms will be used to best recognize the gestures, depending upon the use case, the gesture database which is available, the possibility to train the algorithms with the specificities of a definite user, the processing power which is available and the target cost/performance ratio.

As can be seen from the comments above in relation with FIG. 1 and FIG. 2, the same type of hardware can be used for pointing and gesture recognition and a need for both technologies is felt in more and more fields of application, with a trend for gesture recognition to be able to overcome the limitations of the usual point and click solution, as gesture recognition can provide shortcuts to quickly launch commands. For instance, when using a pointing device to control a TV set, a person may need to point at a first specific zone of the display to activate volume control and at a second specific zone of the display to activate channel zapping, and then to drag a virtual cursor up or down to increase/lower the audio volume or zap upward/downward. It will be advantageous to the user if the pointing device also has gesture recognition capabilities, because in this case the user can perform the same functions, and will only have to draw in the air a "V" in the first instance and a "C" in the second instance and then to move the device upward/downward, without any connection with any cursor on the screen.

There are many use cases where a combination of pointing and gesture recognition will be advantageous. We will use the example of a user controlling a multimedia system to listen to music to demonstrate how the pointing mode, the analog control mode and the gesture recognition mode can interact. The user can use the device in the pointing mode in order to choose the album or artist he wants to listen to from a list of albums or artists that is shown on the screen. Once he is listening to a certain album he can use the gesture recognition mode to move forward or backward to other songs by making swiping gestures left or right in the air. Of course, other commands like play, pause, etc. will also have their dedicated gestures. To change the volume of the music the user can use the analog control mode and simply rotate the remote up and down along a single axis. This single axis gesture will open the volume control of the system, for example a vertical graphics bar representing the volume level so that the user can change the volume.

The interaction between these different modes preferably has an intuitive and user friendly solution. Therefore, a seamless combination of pointing and gesture recognition is desired on the same hardware platform, i.e. a remote control having motion sensors, such as a remote control of FIG. 1 capable of also using the algorithms which allow the use cases of FIG. 2. To implement an embodiment of the invention, it is only necessary to adapt the software in the remote control or in a base station in communication with the remote. Various embodiments of the invention offer a solution to control the pointing mode, analog control mode and the gesture recognition mode by using only a single trigger button on the remote control. By analyzing both the time the user presses said trigger button, and the quantity of movement of the remote during the button press, the system is able to determine the intention of the user.

Figure 3A:
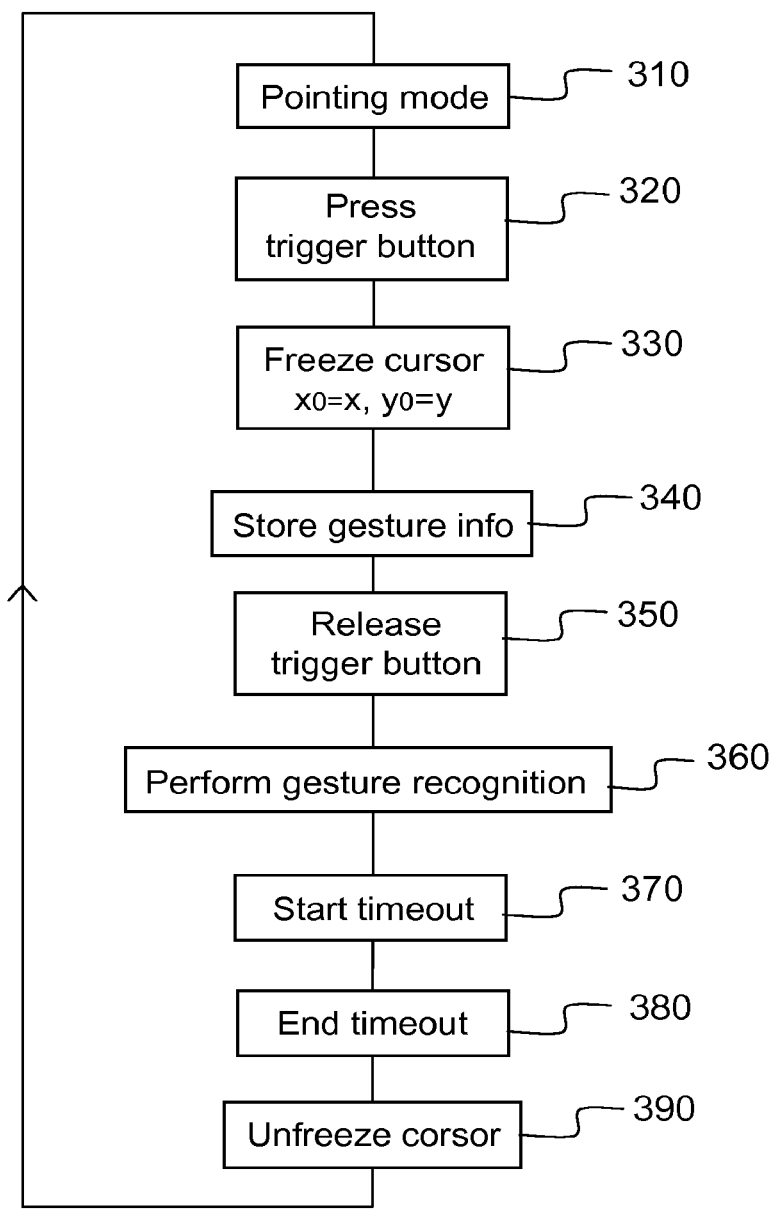
FIG. 3a displays a flow chart of processes to implement switching between the cursor control mode and the gesture recognition mode.

FIG. 3a illustrates an embodiment of the invention when a user switches from the pointing mode to the gesture recognition mode and vice-versa. The gesture recognition mode may also include the analog control mode since the single axis gesture is simply a special kind of gesture.

The user is in the pointing mode, 310, controlling the cursor on the screen, and wants to enter a gesture. This gesture can be entered, for example, to put a tick mark ("V") on an item to select it, or a cross ("X") on an item to delete it.

Figure 3B:
FIG. 3b displays a number of examples of gestures which can be recognized with the interface of the invention.
Figure 3B:
Figure 3B:
Figure 3B:
Figure 3B:
Figure 3B:
Figure 3B:
Figure 3B:
Figure 3B:
Figure 3B:

FIG. 3*b* displays a number of examples of gestures which can be recognized with the interface of the invention.

A quasi-infinite number of gestures with corresponding commands of the base station may be defined. For example, the horizontal and vertical swipe gestures could be used for navigating from one item to the next item on the display. The gestures will be defined based on their ergonomics and on the specificities of a target application for a definite base station. This can be left to be programmed by the integrator of the application through an Application Programming Interface.

Coming back now to FIG. 3*a*, to enter the gesture recognition mode, the user has to press the trigger button, 320, and perform the gesture in 3D while keeping the button pressed. User test confirm that it is preferred to "freeze" the cursor during the gesture. This means that at the start of the gesture, the cursor is fixed at its current position, by a cursor freeze action, 330, and thus does not move during the gesture. One advantage is that when the user switches to gesture mode, he does not wish his cursor to move due to the motion he imparts to the device for gesture recognition as these are different modes. Another advantage is that the user is not limited by trying to make a 2D gesture on the screen because he is influenced by the cursor motion (brain in the loop), and therefore can make a 3D gesture in space. A gesture in 3D is far more natural, fluent and intuitive because the user's brain is not in the loop so he does not need a visual feedback. A visual feedback could even become a drawback as the user could be tempted to control his gesture, slow down his gesture motion, as if drawing on the screen, which would not end up with a natural gesture.

The system records the gesture, 340, while the button is pressed. When the user releases the trigger button, 350, this action is interpreted as the end of the gesture. The system will compare the recorded gesture with the gesture library and execute the corresponding action, 360. At the end of the gesture, when the trigger button is released, the remote control returns to the pointing mode, and the cursor is "unfrozen" and will move again according to the motion imparted to the remote by the user.

It is important to realize that, for a preferred embodiment, the user moved the remote during the gesture, while the cursor did not move on the screen. This means that at the end of the gesture, the relation between the orientation/pointing direction of the remote, and the position of the cursor on the screen can be different from what it was at the start of the gesture. If there is no correction for this difference, which can accumulate after several transitions from the gesture mode to the pointing mode, the relation between the orientation/pointing direction of the remote, and the position of the cursor on the screen may be misaligned and may disturb the user. This misalignment effect is explained in relation to FIGS. 4*a* and 4*b* further down in the description.

In essence, the process of the invention consists in introducing at step 370 a timeout when the gesture recognition process is ended, so that the user uses this time to realign the orientation of the remote with the position of the cursor on the screen, as it was at the start of the gesture. This timeout is preferably of 500 ms, but may depend upon the use cases. At the end of the timeout period, 380, an action of unfreezing the cursor, 390, is performed by the system.

Other actions may be performed by the user of the remote. For instance, it may be necessary, in some of the use cases where the invention is applied, that the user presses a button to launch an action.

For instance, the user may be using the motion-enabled remote as a classic remote. The user may have to press a specific button to change, for example, the channel or change the sound level. We will call this mode the passive mode. In the passive mode the motion of the remote control will not be used to control the cursor on the screen, or analyze gestures by the user. The motion sensors might be powered, or the power might be turned off to save battery power.

If the remote would have both MEMs gyrometers and accelerometers, the power hungry gyrometers could be turned off to save battery power, but the accelerometers that use very little power could be left on to wake up the gyrometers as soon as the user moves the remote.

In these embodiments of the invention, the remote control can have conventional buttons to be pressed to perform specific function and will have ONE dedicated button to switch between different modes. This button is defined in this invention as the trigger button. This trigger button is used to control the different modes of the remote:

Passive mode: control TV by conventional buttons, motion sensors can be set in a sleep mode Pointing mode: control a cursor on the screen Gesture recognition mode: input a gesture in 3D (includes analog control mode)

The following switching actions between modes, which are not explicitly represented on FIG. 3*a* can therefore be performed using variants of the invention:

Passive mode to pointing mode, and back

Passive mode to gesture mode, and back

Pointing mode to gesture mode, and back

The decision to switch between one mode and the other can be based on an analysis of a temporal sequence of the states of the trigger button in combination with an evaluation of the quantity of motion imparted by the user to the remote control as will be explained in details further down in the description. The underlying assumption is that a timed sequence of ON/OFF states of a trigger button can define commands to be executed by/on the base station but that these commands have to be coherent with the actual motion of the remote. Therefore, an analysis in two dimensions of these signals (sequence of ON/OFF states and quantity of motion) can be performed, according to an embodiment of the invention, so that the intent of the user is decoded in an appropriate manner without imposing on him non intuitive behaviors.

An illustration of a switching action between the passive mode and the pointing mode is now described.

Suppose the user is in the passive mode, and he/she wants to use the motion features of the remote to control the cursor on the screen. To do this the user has to click the trigger button, and the system makes the transition from the passive mode to the pointing mode. In the pointing mode, the user can move a cursor on the screen by moving and/or changing the orientation of the remote. To exit the pointing mode, and return to the passive mode, the user has to click the trigger button again. To put it in other words, clicking the trigger button toggles between the passive and pointing modes.

In this example we use a single button click to toggle between the two modes, but, as a variant, a double button click could be required. A double click is more robust as it avoids mode changes when the user accidently presses the trigger button.

A button click is defined as a pressing of the button, immediately followed by a releasing of the button. Before the pressing, the button is in the OFF state, and while the button is held pressed down it is in the ON state. When the button is released, it changes back from the ON to the OFF state. Any type of button or switching mechanism can be used, as long as it has at least two separate states.

The duration of a button click, in other words the sequence OFF-ON-OFF is typically of the order of 300 ms. During the button click the user should not substantially move the remote.

We now describe the case where the user wants to switch from the passive mode to the gesture mode. The user is using the remote in the passive mode and wants to enter a gesture. To do so, the user simply has to press the trigger button and perform the gesture in 3D while keeping the button pressed. The system starts analyzing the motion sensor measurements when the button is pressed.

If the system determines that the user is performing a single axis gesture, it will react immediately to enter the analog control mode. Using the volume control example from above, it is easy to understand that as soon as the user starts the single axis gesture to control the volume, the system should show the visual feedback (volume bar) on the screen. When the user has finished the single axis gesture, the user releases the trigger button and the system parameters, the volume in the example, will be set.

If the system determines that the user is NOT performing a single axis gesture, the system continues to record and process the gesture until the user has finished the gesture and releases the trigger button. The system will then compare the recorded gesture with the gesture library. Optionally, while the user is performing the gesture, the system can already compare the recorded gesture up to that point, and eliminate gestures from the gesture library that cannot match. This can speed up the matching process at the end of the gesture, and will make the system more responsive.

When the user releases the trigger button, the system returns to the passive mode. Note that this does not mean that the motion sensors are immediately put in standby. If the user performs a succession of gestures, it does not make any sense to stop and start the motion sensors between each gesture. Therefore, we introduce a time out period after the end of the gesture before we put the motion sensors in standby. This second timeout period (different from the one introduced when switching from the gesture recognition mode to the pointing mode) is of the order of 10 seconds. If during the time out period after the gesture the remote is not moved substantially, the motion sensors are put in standby and their power is switched off.

It is also possible that the user makes a gesture to indicate which mode he wants to use. For example, if the user is in the passive mode, he can make a gesture to indicate that he wants to use a cursor control mode. In this case, when the user releases the trigger button, the user does not return back to the passive mode, but rather goes straight to the cursor control mode.

Figure 4A:
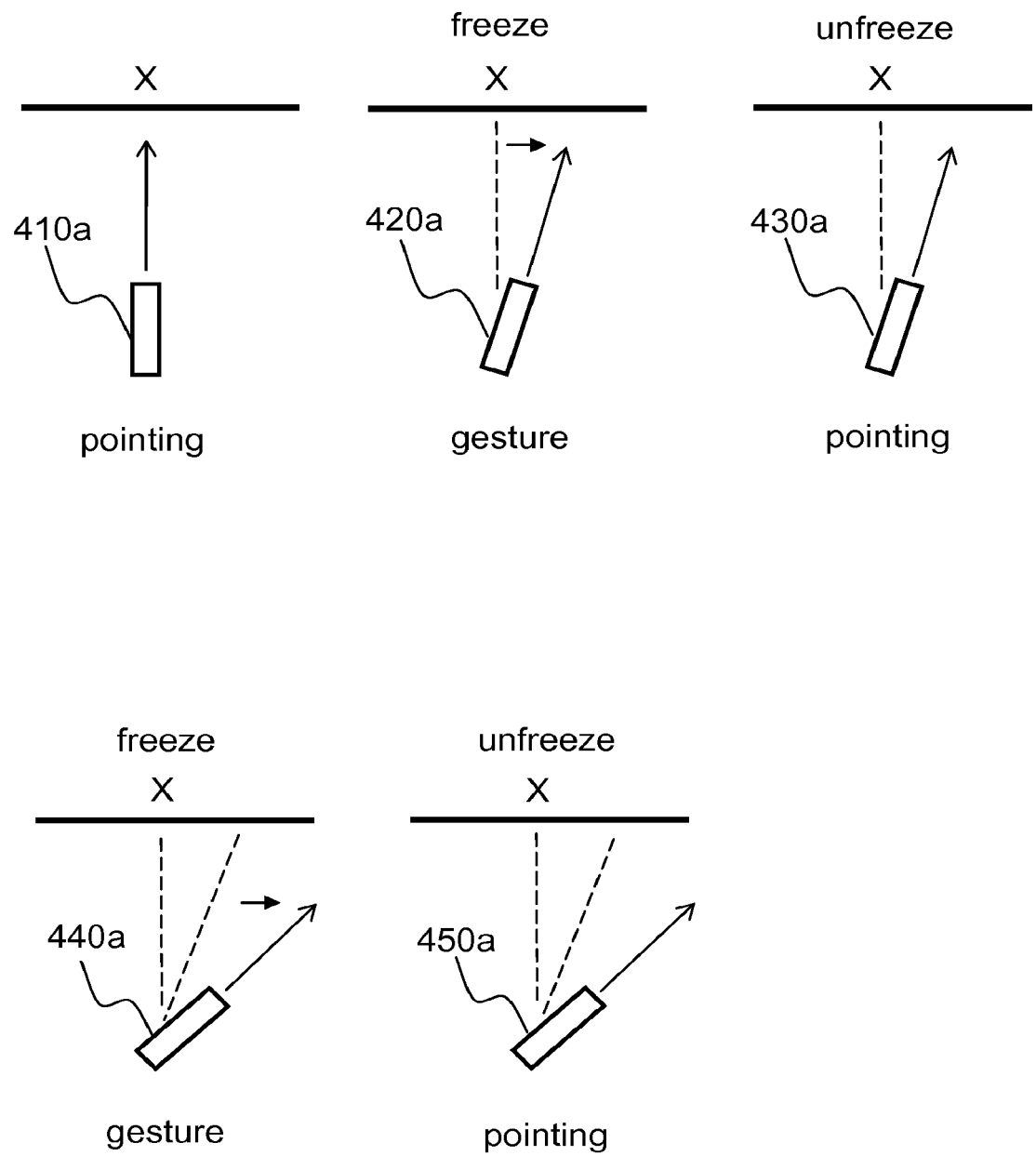
FIGS. 4a and 4b illustrate the pointing alignment problem solved in an embodiment of the invention.
Figure 4B:
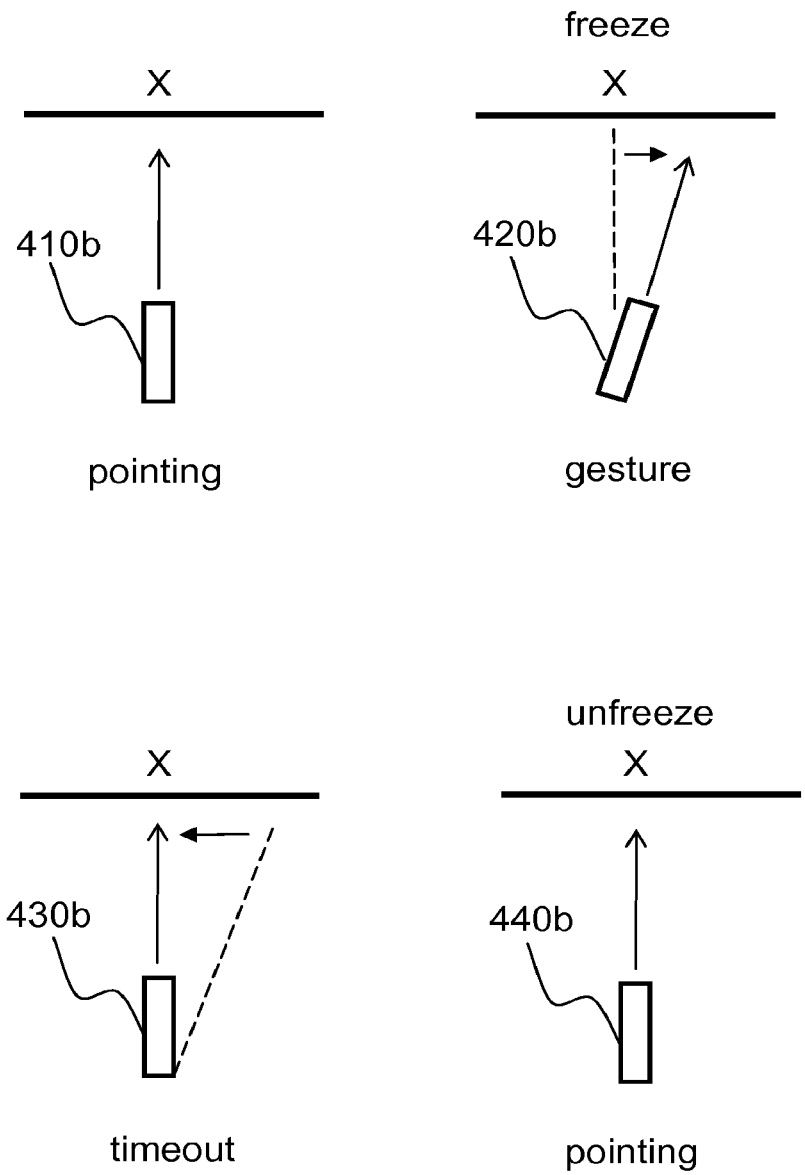

FIGS. 4a and 4b illustrate the pointing alignment problem solved in an embodiment of the invention.

Reference is first made to FIG. 4a. Consider the situation, where the remote 410a is in pointing mode, and is pointing to the cursor X. The direction of pointing and the position of the cursor are perfectly aligned, as would be the case with a laser pointer. Suppose that the user makes a gesture to the right (remote 420a). The cursor is fixed during the gesture, but at the end of the gesture, when the user returns to the pointing mode, the remote is no longer pointing directly at the position of the cursor on the screen (remote 430a). If the user repeats the gesture to the right (remote 440a), at the end the user will be pointing his remote 450a to a position which will be out the limits of the TV screen whereas the cursor to be controlled is in the middle of the screen. This situation may be unnatural and preferably should be avoided.

The way the misalignment problem is corrected is illustrated by FIG. 4b. A timeout is introduced between the end of the gesture and the unfreezing of the cursor. This timeout gives the user the time to correct the orientation of the remote to correspond to the pointing orientation at the start of the gesture (remote 430b). As a result, when the user returns to the pointing mode (remote 440b), the remote points to the cursor. User tests have shown that some users have a natural tendency to move the remote back so that the remote points back to the cursor, while other users might be instructed to do so. This timeout can, for example, be of the order of 500 ms. The cursor will be unfrozen at the end of the timeout, and the pointing mode will be resumed.

Figure 5:
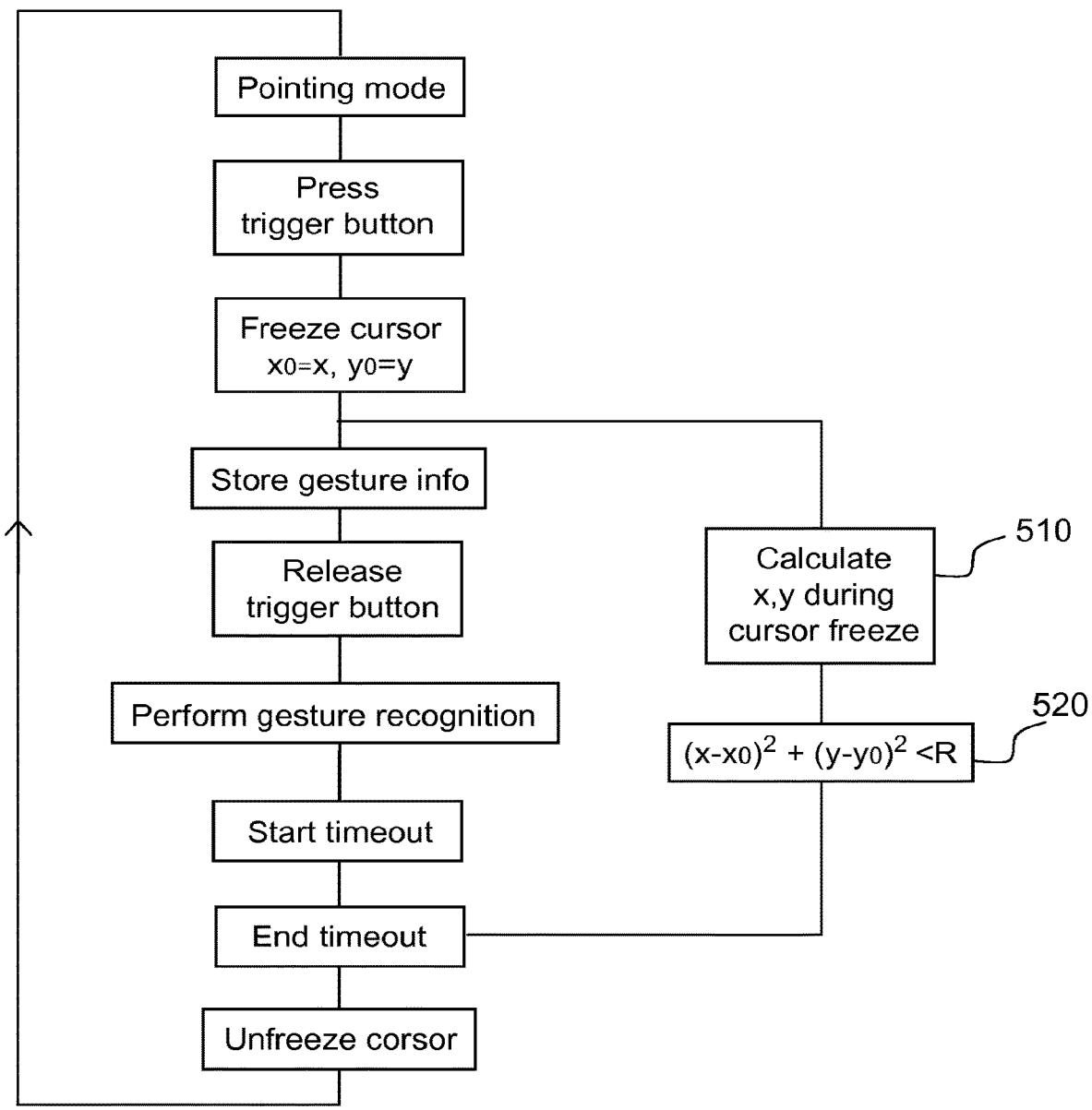

FIG. 5 displays a variant of FIG. 3a.

In a variant of the invention, we can calculate the position of the cursor during the gesture and the timeout, without actually showing the cursor, and unfreeze the cursor before the end of the timeout if the user has approached the initial position within a certain distance R.

In this variant, during cursor freeze, the system will constantly calculate at step 510 the virtual coordinates x, y of the cursor on the screen corresponding to the motion imparted to the remote. But the actual cursor will be kept steady on the screen. When the virtual (invisible) cursor has come back close to the position of the actual cursor before the end of the timeout, the latter is unfrozen so that the transition between the gesture recognition and the pointing mode does not cause any misalignment. How close is set by a parameter R of the system, the comparison between the positions of the two cursors being made at step 520 using the canonical equation $(x-x_0)^2+(y-y_0)^2 \leq R$. R can typically be of the order of 10 mm on an average sized display, but can alternatively also be provided as a pixel distance. Any other metrics (1 Norm, p Norm) or equivalent can be used to provide a distance measurement between the frozen cursor position and the virtual cursor position.

FIGS. 6a, 6b, 6c, 6d and 6e display graphs plotting the duration of the button press and the quantity of motion during the button press of a device according to various embodiments of the invention.

In the use cases of the remote control described above, the trigger button is the single control used to switch between modes. The system has to "decide" which mode the user wants to use from the way the trigger button is pressed/clicked. For example, if the user is in the passive mode, a button click is needed to go to the pointing mode, and a gesture, in combination with a trigger button which is kept pressed, is needed to activate the gesture mode. With conventional techniques, one may experience a wrong switch decision for situations where the user intended a short gesture to be recognized. The user will press the trigger button, move and release the trigger button in less than a normal duration of a click. In many cases, one can observe that a trained user will even start to move the remote with the gesture to be recognized before he presses the trigger button, and then press/release very quickly the trigger button. This is a very common use case for short gestures, which are widely used for very usual gesture commands. For instance a swipe is a very simple and short gesture (cf. FIG. 3b). A check, a back, a close gesture are all also very short and easy to remember gesture, therefore widely accepted and used in a gesture command remote control. So, for all these cases, and using classical techniques described, the remote will detect a click and therefore not switch to a gesture recognition mode. The purpose of various embodiments of the invention is to overcome these defaults and provide a way to discriminate when the user intends to perform a click so as to perform a gesture recognition or to toggle between cursor control to another programmed mode that is not gesture recognition. An embodiment of the present invention will use both the duration of the Press/Release sequence, and the quantity of motion that the user imparts to the remote, so that a short click (press/release) of the trigger button, but performed while moving the remote, will be detected as the intent of the user to perform a gesture recognition. On the other hand, a rather long click with no motion will be interpreted as a click intention.

The system is able to distinguish between a click and a gesture by measuring both the duration of the button click AND the quantity of motion during the button click. The duration of the button click is the time elapsed between the pressing and the releasing of the button. The quantity of motion represents the amount of movement of the remote during the button press. To determine the quantity of movement we can use the entire duration of the button press or only a part of the duration. Alternatively, we can also use maximum values, for example, the maximum speed of the remote during the button press.

The quantity of motion can be derived from the signals of the motion sensors. For example, we can use the integral or sum of the squared gyrometer signals for the duration of the button click:

$$Q_{motion} = \Sigma S_G^2$$

where $Q_{motion}$ is the quantity of motion and $S_G$ represent the signals of the gyrometer.

If a camera and marker based system is used, the quantity of motion can be derived from the displacement of the detected marker position on the recorded camera image. For example, the quantity of motion can be defined as a norm of the pixel displacements of the marker position calculated within the sequence of images recorded by the camera for the duration of the gesture.

The quantity of motion can be adapted to any motion sensor signal which is used for the pointing or gesture function. The man skilled in the art will be able to adapt the principle to the available motion sensors, so as to create a quantity of motion criteria that will trigger a motion detection situation.

Note that instead of deriving the quantity of motion in a direct manner from the motion sensor signals, one can also use the cursor's motion or a virtual cursor as computed or delivered by the pointing function so as to build the quantity of motion. A criteria based on the "distance" or "speed" traveled by the cursor can be a solution, for instance. This method could be used, for example, if it is not possible to access the motion sensor signals directly.

Figure 6A:
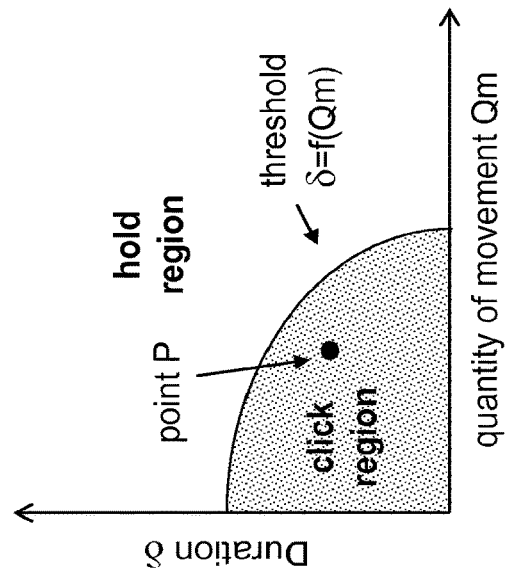
FIGS. 6a, 6b, 6c, 6d and 6e display graphs plotting the duration of the button press and the quantity of motion during operation of a device according to various embodiments of the invention.

FIG. 6a graphically explains how to distinguish between a button click and a gesture recognition command request by using both the button click duration $\delta_{ON}$ and the quantity of motion $Q_{motion}$. To qualify as a click, the duration and the quantity of motion BOTH should be below re-set thresholds $\delta_{ON}^{max}$, $Q_{motion}^{max}$. The click region is represented by the grey area, 610a, on the figure. Thus, a click is a short press-depress action sequence without any significant movement of the remote. The thresholds can be set through user tests. If one of the conditions is not met, the movement will fall into the hold region. The hold region is characterized by the fact that the user has held the trigger button in the ON state longer than for a typical button click, or has moved the remote substantially during the ON state. A representative example of a user action that will fall into the hold zone, is when the user makes a gesture with the remote. Therefore, in the description of the figure we will continue to use a gesture as an (non-limitative) example of a user action belonging to the hold region.

Different thresholds may be set for switching between modes, depending on the current mode and the desired target mode.

On the figure, the area 610a has a rectangular shape because both the duration and quantity of motion thresholds are fixed.

Figure 6B:
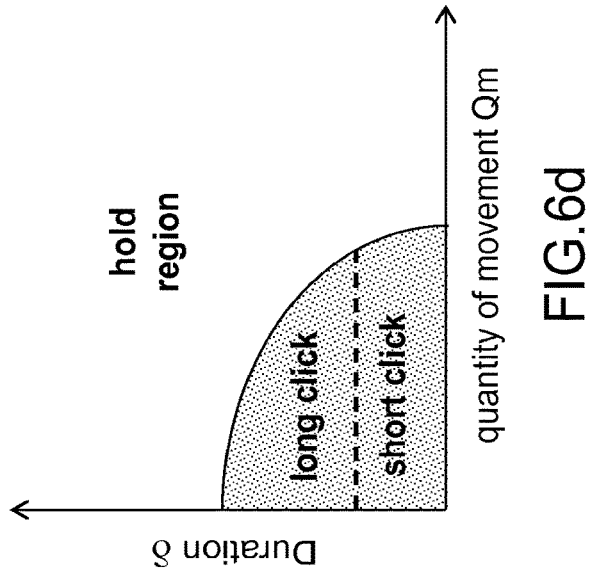

However, referring now to FIG. 6b, we are not limited to fixed thresholds for $\delta_{ON}^{max}$ and $Q_{motion}^{max}$. We can define regions in the plane formed by the $\delta_{ON}$ and $Q_{motion}$ axes. The figure shows the click region, represented by the grey area, and the hold region. The boundary between these regions can be represented by a function $\delta_{ON}^{max} = f(Q_{motion})$. The reasoning behind the shape of the boundary is that a gesture where the user moves the remote very fast (i.e. high quantity of motion), tends to be shorter than a slow gesture, and the represented boundary condition can cope with this type of situation. To determine whether the user of the remote has performed a click or a gesture, we have to determine if the point P, formed by the duration $\delta_{ON}$ and the quantity of motion $Q_{motion}$ of the user's action, lies within the click region. If this is the case (as in FIG. 6b), we determine that the user has performed a click, if the point P lies outside the click region, and thus in the hold region, we determine that the user has performed a gesture.

The optimum dependence can be determined by user tests. In more complex systems, different boundary conditions represented by the functions $\delta_{ON}^{max} = f(Q_{motion})$ can be determined for different users or classes of users.

Figure 6C:
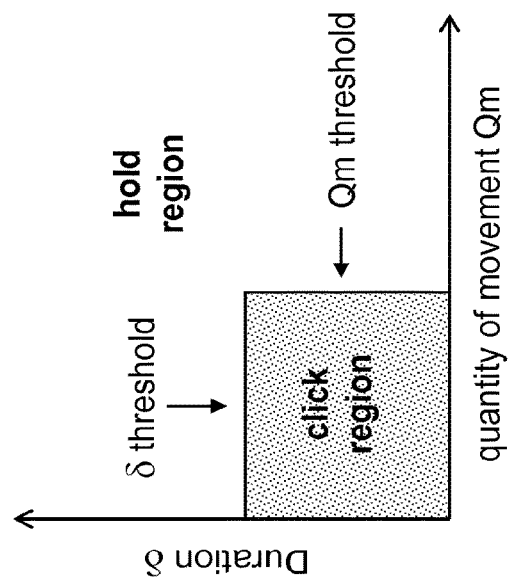
Figure 6D:
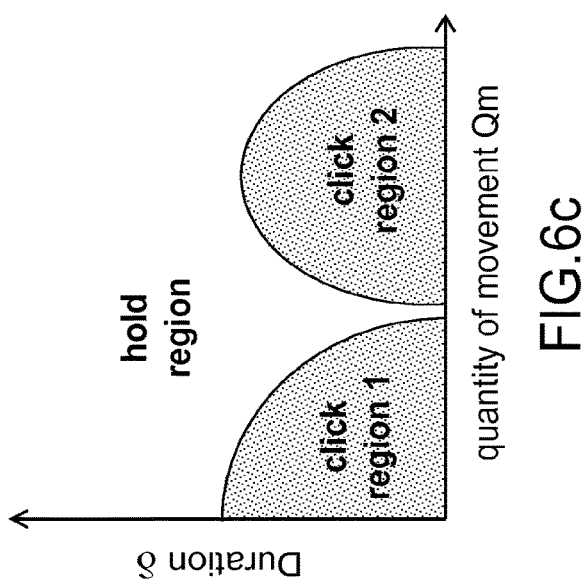

FIG. 6b shows a single click region, but it is possible to define multiple regions. FIG. 6c shows an example for which a set of regions is used to define the switching decision.

Furthermore, a region can also be divided into sections or subsets of a region, which together will define a set of regions. For example, we can define a "short click" region and a "long click" region, as demonstrated in FIG. 6d. This case might be useful to enable the user to use the trigger button to perform a click to e.g. select objects in the cursor control mode. We can define that a long click, with a duration for example between 1000 ms and 1500 ms, is used to switch between the passive mode and the cursor control mode, and that while in the cursor control mode, a short click (about 500 ms) is used to select objects.

Figure 6E:
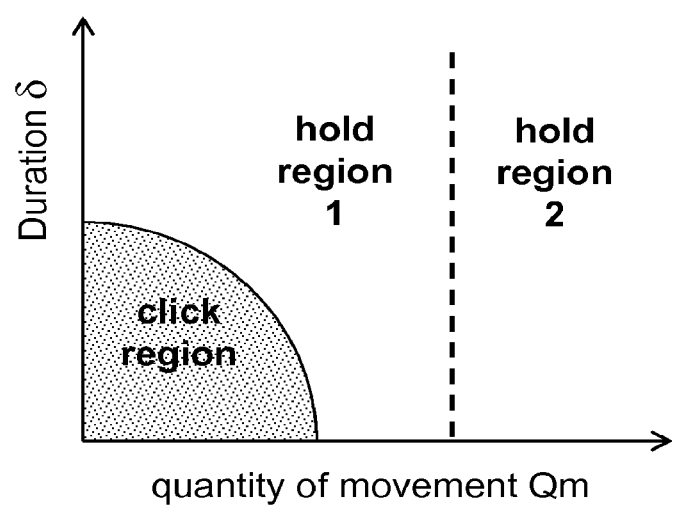

FIG. 6e will help understand the use of multiple regions defining together a set of regions. Each region can represent a class of user actions, for example like a group of gestures or even a single gesture. When the user makes a certain gesture, it has a certain duration and a certain quantity of movement. If the user repeats the gesture, the duration and quantity of movement will be similar, but they won't be exactly the same. Thus, the repeated gesture will form a sort of cloud in the plane formed by $\delta_{ON}$ and $Q_{motion}$. This cloud can be defined as a region or a set of regions.

In the figure we have defined two hold regions. Hold region 1 represents a hold region with a limited quantity of movement, while hold region 2 represents a hold region with a large quantity of movement. These different hold regions can be used to characterize two different gesture classes. For example, hold region 1 can represent a navigation gestures class (e.g., swipes to go forward or backward), since swipe gestures in general have a low quantity of movement. Hold region 2 can represent a command gestures class, which can include more complex gestures with a larger quantity of movement, for example to indicate a switch to a certain mode.

In the description of the invention and the figures we have constantly used the term button click or press, and we have shown that a button click or press is short without substantial movement of the remote control. Although a single button click is the simplest embodiment, other variations are possible. A single click could be accidently triggered by the user, so a double click would be more robust. In this case, the two clicks should be short and in short succession (about 500 ms). The quantity of motion of the double click could be a sum of the quantities of motion of the two individual clicks.

The examples disclosed in this specification are only illustrative of some embodiments of the invention. They do not in any manner limit the scope of said invention.

What we claim is:

1. An interface device comprising:
    a portable electronic control device with at least one button, the portable electronic control device capable of communicating with a data output device;
    a motion sensor for generating motion signals at least partially representative of motion of the portable electronic control device; and
    a processor configured to:
        process said motion signals in at least one of a first mode and a second mode of operation of said interface device, and
        switch operation of the interface device between said first and second modes, at least one of said first and second modes enabling operation of said interface device based on motion of the portable electronic control device, wherein a switching decision to switch operation of the interface device is based on at least an evaluation of i) a duration $\delta_{ON}$ indicative of a length of time of an ON state during which a user presses the button in a press and release cycle of the button, and ii) a function $Q_{function}$ representative of a quantity of motion imparted to the portable electronic control device by the user, derived from the motion signals obtained during a portion of said ON state.

2. The interface device of claim 1, wherein the portable electronic control device comprises one of a remote control, handheld controller, game controller, smart watch, smartphone, telephone, or wearable device.

3. The interface device of claim 1, wherein the switching decision is further based on a determination of a position of a point defined at least by two coordinate values, in relation to at least one region in a coordinate system defined by axes where said point is plotted, the axes respectively corresponding to the duration $\delta_{ON}$ and the function $Q_{motion}$, the at least one region corresponding to one of the first mode and the second mode.

4. The interface device of claim 3, wherein the at least one region defines a class of actions of the user.

5. The interface device of claim 4, wherein the class of actions comprises at least one of a hold action, a click action, a short click action, or a long click action.

6. The interface device of claim 1, wherein at least one of the first mode or the second mode comprise a non-motion mode, a pointing mode, a gesture mode, or a single axis gesture mode.

7. The interface device of claim 1, wherein at an end of the ON state, the operation of the interface device switches to a mode in which the interface device was operating prior to a beginning of the ON state.

8. A user to machine interface device comprising:
    a remote control with at least a trigger button, the remote control capable of communicating with a base station;
    a motion sensor for generating motion signals at least partially representative of motion of the remote control; and
    a processor configured to:
        process said motion signals in at least one of a first mode and a second mode of operation of said user to machine interface device, and
        switch operation of the user to machine interface device between said first and second modes, at least one of said first and second modes enabling operation of said user to machine interface device based on motion of the remote control, wherein a switching decision to switch operation of the interface device is based at least on an evaluation of i) a duration $\delta_{ON}$ indicative of a length of time of an ON state during which a user presses the trigger button in a press and release cycle of the trigger button, and ii) a function $Q_{motion}$ representative of a quantity of motion imparted to the remote control by the user, derived from motion signals obtained during a portion of said ON state.

9. The user to machine interface device of claim 8, wherein the switching decision is further based on a determination of a position of a point defined at least by two coordinate values, in relation to at least one region in a coordinate system defined by axes where said point is plotted, the axes respectively corresponding to the duration $\delta_{ON}$ and the function $Q_{motion}$, the at least one region corresponding to one of the first mode and the second mode.

10. The user to machine interface device of claim 9, wherein the at least one region defines a class of actions of the user.

11. The user to machine interface device of claim 10, wherein the class of actions comprises at least one of a hold action, a click action, a short click action, or a long click action.

12. The user to machine interface device of claim 8, wherein at least one of the first mode or the second mode comprise a non-motion mode, a pointing mode, a gesture mode, or a single axis gesture mode.

13. The user to machine interface device of claim 8 wherein at an end of the ON state, the operation of the user to machine interface device switches to a mode in which the user to machine interface device was operating prior to a beginning of the ON state.

14. A user to machine interface device comprising:
    a remote control with at least a trigger button, the remote control capable of communicating with a base station;
    a motion sensor for generating motion signals at least partially representative of motion of the remote control; and
    a processor configured to:
        process said motion signals in at least one of a first mode and a second mode of operation of said user to machine interface device, and
        switch operation of the user to machine interface device between said first and second modes, at least one of said first and second modes enables operation of said user to machine interface device based on motion of the remote control, wherein a switching decision to switch operation of the interface device is based at least on an evaluation of i) a duration $\delta_{ON}$ indicative of a length of time of an ON state during which a user presses the trigger button, and ii) a function $Q_{motion}$ representative of a quantity of motion imparted to the remote control by the user, derived from motion signals obtained during a portion of said ON state.

15. The user to machine interface device of claim 14, wherein the switching decision is further based on a determination of a position of a point defined at least by two coordinate values, in relation to at least one region in a coordinate system defined by axes where said point is plotted, the axes respectively corresponding to the duration $\delta_{ON}$ and the function $Q_{motion}$, the at least one region corresponding to one of the first mode and the second mode.

16. The user to machine interface device of claim 15, wherein the at least one region defines a class of actions of the user.

17. The user to machine interface device of claim 16, wherein the class of actions comprises at least one of a hold action, a click action, a short click action, or a long click action.

18. The user to machine interface device of claim 14, wherein at least one of the first mode or the second mode comprise a non-motion mode, a pointing mode, a gesture mode, or a single axis gesture mode.

19. The user to machine interface device of claim 14, wherein at an end of the ON state, the operation of the user to machine interface device switches to a mode in which the user to machine interface device was operating prior to a beginning of the ON state.

20. An interface device comprising:
a portable electronic control device with at least one button, the portable electronic control device capable of communicating with an information output device;
a motion sensor for generating motion signals at least partially representative of motion of the portable electronic control device; and
a processor configured to:
process said motion signals in at least one of a first mode and a second mode of operation of said interface device, and
switch operation of the interface device between said first and second modes, at least one of said first and second modes enables operation of said interface device based on motion of the portable electronic control device, wherein a switching decision to switch operation of the interface device is based at least on an evaluation of i) a duration $\delta_{ON}$ indicative of a length of time of an ON state during which a user presses the button, and ii) a function $Q_{motion}$ representative of a quantity of motion imparted to the portable electronic control device by the user, derived from motion signals obtained during a portion of said ON state.

21. The interface device of claim 20, wherein the switching decision is further based on a determination of a position of a point defined at least by two coordinate values, in relation to at least one region in a coordinate system defined by axes where said point is plotted, the axes respectively corresponding to the duration $\delta_{ON}$ and the function $Q_{motion}$, the at least one region corresponding to one of the first mode and the second mode.

22. The interface device of claim 21, wherein the at least one region defines a class of actions of the user.

23. The interface device of claim 22, wherein the class of actions comprises at least one of a hold action, a click action, a short click action, or a long click action.

24. The interface device of claim 20, wherein at least one of the first mode or the second mode comprise a non-motion mode, a pointing mode, a gesture mode, or a single axis gesture mode.

25. The interface device of claim 20, wherein at an end of the ON state, the operation of the interface device switches to a mode in which the interface device was operating prior to a beginning of the ON state.

26. An interface device comprising:
a remote control with at least a button;
a motion sensor for generating motion signals at least partially representative of motion of the remote control; and
a processor configured to:
process said motion signals in at least one of a first mode of operation and a second mode of operation of said interface device, and
switch operation of the interface device between said first and second modes, at least one of said first and second modes enabling operation of said interface device based on motion of the remote control, wherein at least a switching decision to switch operation of the interface device is based on i) a duration indicative of a length of time of an ON state during which the button is in a press and release cycle and ii) a quantity of motion imparted to the remote control, derived from motion signals obtained during a portion of said ON state.

27. The interface device of claim 26, wherein the switching decision is further based on a determination of a position of a point defined at least by two coordinate values, in relation to at least one region in a coordinate system defined by axes where said point is plotted, the axes respectively corresponding to the duration and the quantity of motion, the at least one region corresponding to one of the first mode and the second mode.

28. The interface device of claim 27, wherein the at least one region defines a class of actions of a user.

29. The interface device of claim 28, wherein the class of actions comprises at least one of a hold action, a click action, a short click action, or a long click action.

30. The interface device of claim 26, wherein at least one of the first mode and the second mode comprise a non-motion mode, a pointing mode, a gesture mode, or a single axis gesture mode.

31. The interface device of claim 26, wherein at an end of the ON state, the operation of the interface device switches to a mode in which the interface device was operating prior to a beginning of the ON state.

* * * * *